United States Patent
Bolton et al.

(12)

(10) Patent No.: US 6,841,588 B1
(45) Date of Patent: Jan. 11, 2005

(54) RADIATION CURABLE RESIN COMPOSITION

(76) Inventors: Robert John Bolton, 6 Coventry Place, West Pymble South Wales 2073 (AU); Kevin George Jarrett, 3B Niland Way, Casula New South Wales 2170 (AU)

( * ) Notice: Subject to any disclaimer, the term of this patent is extended or adjusted under 35 U.S.C. 154(b) by 0 days.

(21) Appl. No.: 09/936,599

(22) PCT Filed: Mar. 17, 2000

(86) PCT No.: PCT/AU00/00197

§ 371 (c)(1),
(2), (4) Date: Apr. 24, 2002

(87) PCT Pub. No.: WO00/55228

PCT Pub. Date: Sep. 21, 2000

(30) Foreign Application Priority Data

Mar. 17, 1999 (AU) .............................................. PP9225

(51) Int. Cl.[7] .......................... C08J 7/04; C09D 163/10; C09D 175/14; C09D 179/02; C08F 2/46
(52) U.S. Cl. ........................... 522/84; 522/85; 524/815; 524/816
(58) Field of Search ............................ 522/84, 85, 86; 526/258–265, 301, 302, 315, 317.1, 318; 524/839, 843, 845, 815, 816

(56) References Cited

U.S. PATENT DOCUMENTS

| | | | |
|---|---|---|---|
| 3,844,916 A | * | 10/1974 | Gaske |
| 4,139,499 A | | 2/1979 | Wade et al. .................. 521/32 |
| 4,253,918 A | * | 3/1981 | Traenckner et al. ......... 522/100 |
| 4,297,185 A | | 10/1981 | Chevreux et al. ....... 204/159.15 |
| RE31,022 E | * | 8/1982 | Buchwalter et al. ......... 523/418 |
| 4,451,568 A | | 5/1984 | Schneider et al. .......... 435/181 |
| 5,135,963 A | * | 8/1992 | Haeberle et al. |
| 5,847,022 A | | 12/1998 | Yamashina et al. ......... 522/149 |
| 6,087,417 A | * | 7/2000 | Stevenson et al. .......... 523/414 |

FOREIGN PATENT DOCUMENTS

| | | |
|---|---|---|
| AU | 88546/82 | 6/1983 |
| EP | 0 214 089 | 3/1987 |
| WO | WO 97/14750 | 4/1997 |
| WO | WO 98/31719 | 7/1998 |

OTHER PUBLICATIONS

W.D. Cook and G.B. Guise, "Polymer Update: Science and Engineering", Australian Polymer Science Series vol. 2, Polymer Division, Royal Australian Chemical Institute (1989), pp. 22–25.

* cited by examiner

Primary Examiner—Susan Berman
(74) Attorney, Agent, or Firm—Duane Morris LLP

(57) ABSTRACT

A radiation curable resin composition comprising a water soluble amine salt prepolymer formed between an oligomer or compound having at least one amine group and an unsaturated carboxylic acid and use of this composition as a surface coating or ink.

19 Claims, No Drawings

RADIATION CURABLE RESIN COMPOSITION

The present invention relates to radiation curable resin compositions and to method of using such compositions.

The use of ultraviolet (UV) radiation or electron beam (EB) radiation as the energy source for cross linking functional monomers, oligomers and polymers is the basis of important commercial processes with broad applicability in photo imagery coatings inks and adhesive.

The most predominant type of resin systems used contain an oligomer such as epoxy acrylate, urethane acrylate or unsaturated polyester, a monomer diluent which is a poly-unsaturated acrylic or vinyl monomer and an initiator.

The radiation curing processes, particular those involving UV radiation, generally rely on a polymerisation initiator which in the presence of the appropriate radiation generates activated species which initiate the polymerisation reactions and produce curing. Examples of photoinitiators used in UV curable composites include benzoin ethers such as benzyl methylether, hydroxydialkylacetophenones such as a α-hydroxy-α,α-dimethylacetophenone and 1-benzoylcyclohexanol, acylphosphine oxides, cyclic benzoin ethers, benzophenone, Michlers ketone and ketocoumarins.

The currently used radiation curable resin compositions are relatively expensive when compared with other coating systems due to the relatively high cost of resins, monomers and photoinitiators.

In many instances it is also difficult to achieve effective surface cure of the resins. Oxygen tends to inhibit polymerisation at the surface leading to undesirable surface tackiness. The use of certain photoinitiator combinations such as benzophenone and amines have been used to counteract this problem but may lead to undesirable odour or colouration. Inert gases have been used to reduce oxygen-inhibition but they are a further expense and are impractical in many commercial environments.

The existing compositions are also completely polymerisable to avoid the use of solvents or diluents. This makes it difficult in many instances to formulate semigloss and flat coatings or films of low film weight.

Furthermore many of the low viscosity, low molecular weight monomers have a high draize value and their use is minimized for health reasons.

We have now developed versatile radiation curable resin compositions which significantly reduces and in many cases eliminates the need for addition of a photoinitiator and which may address one or more further shortcomings of the prior art described above.

Accordingly we provide a radiation curable resin composition comprising a water soluble amine salt prepolymer formed between an oligomer having at least one amine group and an unsaturated carboxylic acid.

One of the significant advantages of the prepolymers used in the composition of the invention is their water solubility. The prepolymer may generally be diluted in water to at least 50% by weight permitting their use not only in high gloss but also matt or semi gloss films.

The weight ratio of the amine salt prepolymer to water in the resin composition of the invention is typically in the range of from 1:4 to 20:1 more preferably from 3:2 to 9:1 and most preferably from 3:2 to 8:1.

Despite their solubility in water the resins will generally polymerise on exposure to radiation after application to a substrate forming tough water resistant coatings without the need to take any special steps to remove water although dying may be promoted using known methods if desired.

The oligomer component of the salt may be selected from a range of oligomers. Typical example of suitable classes of oligomers include epoxy-amine adducts, amino resins such as urea formaldehyde and melamine formaldehyde type resins, amine-polyisocyanate adducts, and Michael adducts of an aliphatic amine and polyacrylate or polymethacrylate compound.

The preferred oligomer components are selected from epoxy-amine and amino resins.

The most preferred prepolymers for use in the radiation curable composition of the invention are a salt of an epoxy-amine adduct and the unsaturated acid.

The epoxy resins from which the adduct may be formed are known in the art. One class of suitable epoxies is of the formula I:

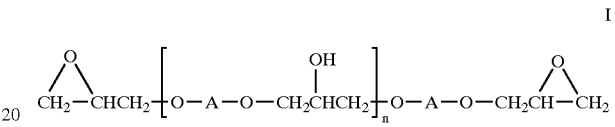

n is from 0 to 10 and

A is a diradical selected from the group consisting of aliphatic, substituted aliphatic, aromatic, substituted aromatic, cycloaliphatic, substituted cycloaliphatic alkylene dicarbonyl and the diradical group of formula II:

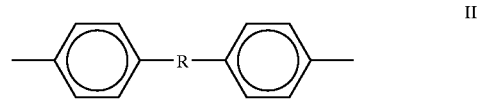

wherein R is an alkylene group of 1 to 4 carbon atoms. Preferred group A include $C_2$ to $C_{22}$ alkyl dioxybenzene and $C_4$ to $C_{22}$ alkylene dicarbonyl and groups of formula II. Most preferably A is of formula II.

The most preferred epoxy is a condensation product of bisphenol A and epichlorohydrin.

The amine will generally react with the terminal epoxy groups to form one or more terminal amine groups depending on the stoichiometry of the reaction. In cases where the stoichiometry used does not produce a reaction with all epoxy groups the remaining groups may be reacted to provide other functional groups such as ester groups by reaction with unsaturated acids or ethers by reaction with alcohols or alcohol groups by reaction with water.

The stoichiometry of the epoxy amine adduct is preferably in the range of from 0.5 to 2.05 mole of amine compound per mole of epoxy compound, more preferably from 0.95 to 1.6 and most preferably from 1.0 to 1.5.

The reaction between the epoxy and amine is exothermic and if allowed to proceed may produce an undesirably viscous resin. It is therefore preferable to control the reaction temperature and also quench the reaction by combining the reaction product with water and preferably stirring the aqueous mixture. The unsaturated acid is preferably added to the aqueous mixture and generally produces a clear resin solution. In this case excess unreacted epoxy groups may react with water to form diols.

A further embodiment of the invention uses amino resins. The preferred amino resins are based on the reaction products of formaldehyde and urea or melamine. Formaldehyde reacts with urea to form resins which are generally bifunctional. Melamine on the other hand reacts with formaldehyde to form trifunctional resins.

Urea and melamine with formaldehyde and glyoxal are the basic materials but melamine may be partly or completely replaced by benzoguanamine and acetoguanamine. Urea/formaldehyde and/or melamine/formaldehyde are the preferred amino resins. Further examples of preferred type of amino resins include ethylene urea, a resin based on dimethylolethylene urea is prepared from urea, ethylene diamine and formaldehyde; propylene urea-formaldehyde, a resin prepared from urea, 1,3-diamino-propane and formaldehyde; triazone resin made from urea, formaldehyde and a primary aliphatic amine such as hydroxyethylamine; uron resins, mixtures of a minor amount of melamine resin and uron (predominantly N,N'-bismethoxymethyl) uron plus about 25% methylated urea formaldehyde; glyoxal resin prepared from urea and/or melamine, glyoxal and formaldehyde and one or more alcohols such as ROH where R is alkyl or an alkyl hydroxy alkyl or alkyl ether of ethylene glycol; melamine-formaldehyde which include the dimethyl ether of trimethylolmelamine; and methylol carbamate resins, derivatives made from urea and an alcohol, ROH wherein R is an alkyl, hydroxy alkyl or alkyl ether of ethylenglycol.

The more preferred amino resins include melamine and formaldehyde and optionally glyoxal and/or urea.

The preferred melamine formaldehyde resins are of the glyoxal type and are prepared from melamine, formaldehyde, glyoxal and preferably further including one or more alcohols selected from the group consisting of $C_1$ to $C_6$ alkanols, $C_1$ to $C_6$ alkyl ethers of $C_1$ to $C_6$ alkylene glycols and $C_1$ to $C_6$ alkylene glycols. To provide good shelf stability it is particularly preferred to include an alcohol. We have also found the efficiency of cure of melamine formaldehyde resins may be improved in many cases by using an acid buffering agent such as phosphoric acid to preferably provide a pH of less than 5.

The oligomer compound of the composition of the invention may be a urethane amine adduct. The amine adduct may be prepared by reaction of an amine with a polyisocyanate. The polyisocyanate may be a simple polyisocyanate such as toluene diisocyanate, diphenylmethane-4,4-diisocyanate or hexamethylene diisocyanate or may be prepared by reaction of a polyol and polyisocyanate. Examples of suitable polyol components include polyester polyols, polyether polyols and polyester polyether block copolymers.

The molar ratio of amine to polyisocyanate used in forming the adduct is typically from 0.90 to 1.6 and most preferably from 1 to 1.5.

Urea groups may be prepared from isocyanate groups of a urethane prepolymer by reaction with water. The preferred urethane amine adduct is based on an aromatic isocyanate.

The oligomer component of the composition of the invention may be a michael adduct formed by reactions of amine with a multifunctional acrylate or methacrylate monomer or prepolymer or mixture of two or more thereof. The michael adduct is preferably formed between a secondary amine and an unsaturated carboxylic acid selected from monomers and oligomers containing a plurality of unsaturated groups including at least one acrylate or methacrylate group. Examples of suitable multifunctional acrylates and methacrylates include urethane acrylates, urethane methacrylates, diisocyanates, polyol diacrylates and dimethacrylates, alkylene diacrylates, alkylene dimethacrylates, oligoester diacrylates and oligoester dimethacrylates wherein the oligoester portion may be formed by reaction of adipic, phthalic, isophthalic acid or their anhydrides with polyols such as alkylene glycol or polyalkylene glycol as well as triols such as trimethylol propane and tetrols such as pentaerylthritol.

Examples of michael adducts are described in U.S. Pat. No. 3844916 (Gaske) and will preferably be formed by reaction of a secondary amine and multifunctional acrylate/methacrylate.

The Michael adducts will generally include an amino group of formula III as a result of the addition:

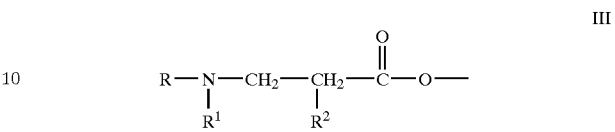

III wherein R and $R^1$ are preferably as defined below for the amine of formula IV and $R^2$ is methyl or hydrogen.

The amine group or groups which are present in the prepolymer component of the composition of the invention are preferably selected from secondary amines, secondary alkanolamines and mixtures of two or more compounds from these groups. The preferred amines are of formula IV:

IV wherein R and $R^1$ are independently selected from the group consisting of straight and branched chain aliphatic of up to 10 carbon atoms optionally substituted by hydroxy and preferably R and $R^1$ are $C_1$ to $C_6$ alkyl optionally substituted by hydroxy. The hydroxy substitution is preferably on a primary carbon atom which is not directly adjacent an amino nitrogen. Particularly preferred R and $R^1$ are ethyl, 2-hydroxy ethyl, propyl, 3-hydroxypropyl. Most preferably the amine is diethylamine or diethanolamine.

It is preferred that the amine component is substantially free of primary amine and preferably it contains less than 5% by weight of primary amine. This is particularly preferred where the oligomer is an amine adduct of an epoxy or polyisocyanate. The presence of amine compositions containing at least 95% secondary amine and preferably at least 98% produces lower viscosity resins which tend to have better long term stability.

The oligomer component of the radiation curable resin composition of the invention is in the form of a salt with an unsaturated carboxylic acid. The preferred unsaturated acids are αβ unsaturated carboxylic acid particularly those selected from the group consisting of acrylic acid, citraconic acid, sorbic acid, fumaric acid and mixtures of two or more thereof. The preferred unsaturated acids are compounds of the formula:

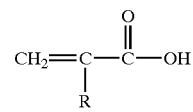

wherein R is hydrogen $C_1$ to $C_4$ alkyl and preferably hydrogen or methyl. The preferred unsaturated acids are thus acrylic acid and methacrylic acid. Mixtures of two or more unsaturated acids may also be used.

The molecular weight of the oligomer resins used in the composition of the invention may vary significantly depending on their proposed use and concentration. Typically the molecular weight of the oligomer salt is in the range of from 500 to 20,000 more preferably from 700 to 10,000 and most preferably from 1000 to 3000.

The resins compositions of the invention may be used in aqueous formulations to form coatings by UV radiation curing. No added initiators are generally required to obtain efficient UV curing although they may be used if desired. Typically the composition will contain less than 0.5% by weight of added initiators and are most preferably free of added photoinitiators. Polymerisation under UV occurs rapidly without generally needing to dry the water used in forming the salts. The UV cured film forms a tack free surface at the air interface.

The composition of the invention is preferably a coating composition or an ink. The composition may be formulated with suitable additives. Examples of suitable additives include surfactants, antifoam agents, inhibitors, pigments, fillers and other resins. Solvents may be included if desired yet are generally not required.

Surfactants may be used where the composition is to be used as a coating for greasy surfaces such as for overcoating inks. Examples of suitable surfactants include silicone derivatives, vinyl silanes and fluorinated wetting agents such as fluoroalkyl ethers.

Inhibitors may be used to inhibit gelling of the composition during storage. Examples of inhibitors include hindered amines such as diphenylamine, phenothiazine and di-p-fluorophenylamine; phenolic and quinone/hydroquinone compounds such as hydroquinone, mono-tertbutylhydroquinone, benzoquinone, 2,5-diphenyl-p-benzoquinone, p-methoxyphenol and 2,6-di-tert-butyl-cresol. Inhibitors are generally used in amount of from 0.01 to 1% and preferably 0.01 to 0.5% by weight.

In a further aspect the invention provides a method of preparing a radiation curable composition comprising forming an amine adduct by reacting of a secondary amine with an epoxy and reacting the amine adduct with an unsaturated carboxylic acid to form a water soluble salt.

The amine adduct and unsaturated carboxylic acid are generally reacted in the presence of water. The reaction which takes place between a secondary amine and epoxy or polyisocyanate is exothermic and we have found that particularly good results are obtained if the reaction mixture of the epoxy or polyisocyanate and secondary amine are diluted with water during the exotherm. This may be done by adding an excess of water or by pouring the reaction mixture into water.

It is surprising to find that the compositions of the invention are generally polymersable by standard UV radiation equipment without the need to use a photoinitiator. The most preferred resins from this point of view are the unsaturated acid salts of epoxy-amine adducts and amine resins. Isocyanate adducts are in some cases less sensitive and may require addition of small amount of for example up to 0.5% by weight of photoinitiator. The reduction or elimination of the photoinitiator component significantly reduces the cost of compositions of the invention when compared with traditional UV curable coatings. Furthermore the component used in preparing the compositions of the invention may be chosen from inexpensive resins, the components of which are readily available. The relatively expensive monomer components required in many prior art compositions can be avoided.

The sensitivity of the compositions of the invention can be compared for different resins and with prior art compositions using the following curing test.

In the curing test a coating film of 5 microns is drawn down on a substrate and is exposed to ultraviolet light of 25 millijoules per $cm^2$. The amount of energy may be measured using a suitable radiometer such as an EIT Uvicure Radiometer Model M365. The lamp which we used in our test was a mercury lamp of 80 w/cm at half power (40 w/cm) and we used a belt speed of 35 meters per minute.

The compositions of the invention will generally cure under the above test conditions with addition of less than 0.5% based on resin component of initiator and the compositions of the invention will in most cases require no added photoinitiator. In contrast compositions of the prior art generally require 5% photoinitiator based on the resin component.

Although the resin compositions generally cure without addition of a photoinitiator the compositions may, if desired contain conventional initiators. Typically when used the photoinitiator will be present in an amount of less than 0.5% by weight based on the total weight of the resin component.

The resin composition is typically prepared as an aqueous solution containing at least 10% by weight oligomer salt. The aqueous solution will typically contain in the range of from 20 to 95% by weight of the resin salt preferably form 50 to 85% and most preferably in the range of from 60 to 80% by weight of resin.

A further significant advantage of compositions of the invention is that their cure is generally not significantly inhibited by oxygen when cured in air. As previously indicated the curing of conventional compositions are inhibited by oxygen in air making it difficult to rely on UV curing for preparing coatings without excluding air by using an inert gas or specific initiator combinations which further increase costs.

The ability to prepare the resins at a range of concentrations makes them particularly versatile in controlling gloss levels. Flat films may be prepared using a relatively dilute composition such as from 40 to 65% by weight resin in water. Gloss films on the other hand may contain 65 to 90% by weight resin in water.

Prior art compositions made it difficult to achieve the same properties without the compositions being undesirably viscous or containing a high proposition of relatively expensive monomer diluent.

Even though the compositions of the invention are prepared and used as an aqueous solution they dry to form a water resistant film which is durable and resistant to solvents.

The compositions of the invention are also relatively non hazardous to skin contact and are essentially odour-free.

Each of these advantages alone has merit and collectively the advantages of compositions of the invention constitute a major commercially attractive advance to the field of radiation cured coatings.

The invention will now be described with reference to the following examples. It is to be understood that the examples are provided by way of illustration of the invention and that they are in no way limiting to the scope of the invention.

EXAMPLES 1 TO 7

These examples demonstrates preparation of compositions of the invention in which a portion of the epoxy groups are pre-reacted with acrylic acid prior to addition of a secondary amine to form the epoxy amine adduct and subsequently formation of the amine/acrylic acid salt.

To 0.1 mole (36 gm of bisphenol A diglycidyl ether (Araldite 6010) is added varying amounts of acrylic acid together with 0.1 g hydroquinone monomethyl ether inhibitor and 0.5 g catalyst. The mixtures are reacted at 100° C. for 40 minutes and then cooled to 95° C., and diethanolamine is added over several minutes, allowing the subsequent exotherm to proceed to 140–150° C. with no external heat. The product is allowed to cool to 90° C., and water is then added with rapid stirring producing a white stable dispersion. Acrylic acid is then added slowly with continuous stirring to solublise the resin solution.

After 15 minutes, the solution is allowed to cool, inhibitor added and transferred to a dark glass container.

| No. | DGEBPA | Acrylic Acid | Diethanolamine | Water | Acrylic Acid | Visc. |
|---|---|---|---|---|---|---|
| 1 | 36 g (0.1 mol) | 5.6 g (0.08 mole) | 12.6 g (0.12 mol) | 20 g | 10 g | >1 p |
| 2 | 36 g (0.1 mol) | 5.6 g (0.09 mol) | 11.5 g (0.11 mol) | 20 g | 7 g | >1 p |
| 3 | 36 g (0.1 mol) | 7.2 g (0.10 mol) | 10.5 g (0.10 mol) | 20 g | 6 g | 420 cp |
| 4 | 36 g (0.1 mol) | 7.9 g (0.11 mol) | 9.5 g (0.09 mol) | 20 g | 6 g | 980 cp |
| 5 | 36 g (0.1 mol) | 8.6 g (0.12 mol) | 8.4 g (0.08 mol) | 20 g | 5 g | 110 cp |
| 6 | 36 g (0.1 mol) | 9.4 g (0.13 mol) | 7.4 g (0.07 mol) | 20 g | 6 g | 620 cp |
| 7 | 36 g (0.1 mol) | 10.1 g (0.14 mol) | 6.3 g (0.06 mol) | 20 g | 4 g | >1 p |

Each sample was then coated onto calendared paper at 5 microns using a wire wound applicator, and passed under UV light at 15 m/minute. Each film was examined for gloss, surface tack, hardness, water and MEK resistance. The results were as follows:

Examples 3, 4 and 5 all cured after one pass to give satisfactory films.

Examples 1 and 2 were more difficult to apply due their viscosity and required two passes to cure.

Examples 6 and 7 were slightly more turbid and produced dull films.

EXAMPLE 8

This example and examples 9 to 21 below demonstrate the preparation of an epoxy amine resin which is reacted with an unsaturated acid to form a resin salt in accordance with the invention. One mole of bisphenol A diepoxide resin was reacted with at least 1 mole of diethanolamine to form an adduct. Allowing the exotherm of this reaction to take its course over 5–10 minutes. The composition was diluted with water or quenched into water to form a stable dispersion of the adduct. To this dispersion, 2 moles of acrylic acid or methacrylic acid were added to produce a cationic resin solution, with very similar properties of those resins formed from epoxy acrylate half ester described in Examples 1 to 7. These resins have low odour and colour and will photopolymerise, when exposed to UV light, to a hard tack-free state.

The resin is of low viscosity and permits solids contents of at least 80%. with as little as 20% water, and have moderately low viscosity. The overall reaction time can be accomplished within 1 hour, by avoiding the longer ester formulation of the method described in Examples 1 to 7. The resins of this example appears to show reduced tendency to auto-polymerise.

EXAMPLE 9

Bisphenol di-glycidyl ether resin (1 mole) 360 g is mixed with diethanolamine (1 mole) 105 g at room temperature, and heated with stirring to 70° C., when it forms a clear homogeneous mixture. At this stage an energetic reaction takes place and the external heat is removed. The resultant exotherm increases the temperature rapidly to 140–150° C. with a corresponding reduction in viscosity of the clear fluid. This is rapidly poured into (10 moles) 180 g of cold water, with fast stirring to produce a white dispersion, with corresponding increase in temperature of the resin mixture. Acrylic acid (2 moles) 144 g, is added over several minutes and a clear resin solution results. The resin solution is allowed to cool, with continuous stirring. The resultant resin is a clear, colourless, low viscosity oligomer solution with almost no odour and a pH of 4–6. When cast as a thin film onto a metal or paper substrate, and exposed to UV light for a few seconds, the resin rapidly produces a hard, tack-free and odour-free clear glossy film, with good water and solvent resistance.

EXAMPLES 10–15

The procedure of Example 8 was followed with the exception that water was added to the resin at the stage of exotherm in which the resultant reflux of water assisted in controlling the heat and provided the dispersion prior to salt formation. Different amines and unsaturated acids were also examined.

| Examples | Ex10 Moles | Ex11 Moles | Ex12 Moles | Ex13 Moles | Ex14 Moles | Ex15 Moles |
|---|---|---|---|---|---|---|
| BPDGE (Araldite 6010) | 1.0 | 1.0 | 1.0 | 1.0 | 1.0 | 1.0 |
| Diethanolamine | 1.0 | 1.0 | 1.3 | 1.6 | 1.0 | 1.0 |
| Water | 10.0 | 10.0 | 10.0 | 10.0 | 10.0 | 10.0 |
| Acrylic acid | 1.0 | 2.0 | 2.0 | 2.0 | — | — |
| Methacrylic acid | — | — | — | — | 1.0 | 2.0 |

Each of these resin solutions was a clear low viscosity solution and produced a hard glossy film after exposure to UV radiation. Example 13 did show a tendency to water sensitivity at the higher ratio of diethanolamine.

EXAMPLES 16–21

| Examples | Ex16 Moles | Ex17 Moles | Ex18 Moles | Ex19 Moles | Ex20 Moles | Ex21 Moles |
|---|---|---|---|---|---|---|
| BPDGE (Araldite 6010) | 1.0 | 1.0 | 1.0 | 1.0 | 1.0 | 1.0 |
| Diethanolamine | 1.0 | 1.0 | 1.3 | 1.6 | 1.0 | 1.0 |
| Diethylamine | — | 1.0 | 0.7 | 0.4 | — | — |
| Urea | — | — | — | — | 0.5 | 1.0 |
| Water | 10 | 10 | 10 | 10 | 10 | 10 |
| Acrylic acid | 2.0 | 2.0 | 2.0 | 2.0 | 2.0 | 2.0 |

These resins displayed differences in viscosity, but each was photocurable and produced satisfactory films.

EXAMPLES 22–28

These examples examine preparation of compositions of is invention using melamine formaldehyde based resins.

EXAMPLE 22

To 324 g of 37% formalin (4 moles) is added 126 g of melamine (1 mole) at room temperature and heated with stirring, to 7° C. and held until clear, about 40 minutes. The solution is cooled to 45° C. and 145 g of 40% glyoxal (1 mole) is added with constant stirring, and held for a further 30 minutes. A clear pale amber solution results, to which is added 144 g of acrylic acid (2 moles), and allowed to cool. The resultant solution to a very pale, clear and odour-free solution which when cast onto a metal or paper substrate and exposed to UV radiation, will cure rapidly to a hard, tack-free and odour-free clear film, with good water and solvent resistance.

The procedure of Example 22 was repeated using various proportions of components and alcohols as shown in the table below.

| Examples | Ex23 Moles | Ex24 Moles | Ex25 Moles | Ex26 Moles | Ex27 Moles | Ex28 Moles |
| --- | --- | --- | --- | --- | --- | --- |
| Formalin 37% | 3 | 3 | 3 | 3 | 3 | 3 |
| Glyoxan 40% | 1 | 1 | 1 | 1 | 1 | 1 |
| Melamine | 1 | 1 | 1 | 1 | 1 | 1 |
| Ethanol | — | 2 | — | — | 2 | — |
| n-Propanol | — | — | 2 | — | — | 2 |
| Hydroxy ethyl acrylate | — | — | — | 1 | — | — |
| Acrylic acid | 2 | 2 | 2 | — | 1 | 2 |

EXAMPLE 29

In a similar manner, to 324 g of 37% formalin (4 moles) is added 126 g of melamine and also 240 g of n-propanol (4 moles) and heated with stirring to 65° C. and held for 30 minutes. A clear solution results which smells faintly only of propanol, to which is added 144 g of acrylic acid (2 moles), and the stirring continued for a further 30 minutes at 50° C., then cooled. This resin solution behaves in the same way as Example 12, will UV cure to a clear glossy film with faint odour of propanol. It does appear to be slightly more flexible in thicker films than Example 22 films.

EXAMPLES 30–33

Resins were prepared according to Example 29 but replacing n-propanol with methanol (Example 30), ethanol (Example 31), butanol (Example 32) and iso-propanol (Example 33). Each resin responded to UV radiation. The iso-propanol resin was the least reactive thought to be due to steric hindrance. The resin based on n-butanol had a stronger residual odour.

EXAMPLE 34 stirring. 1 mole (72 g) of acrylic acid was slowly added. On testing for cure, this resin was found to cure only with 1–2% of photoinitiator (Irgacure 184). formed, followed by salt formation with acrylic acid. Six typical examples were made from cresol glycidyl ether, butanediol glycidyl ether, C12–14 alkyl glycidyl ether, neodecanoic acid diglycidyl ester, as well as butanediol di glycidyl ether and an alicyclic diepoxy carboxylate. These all exhibited some of the desired properties as indicated above, yet were all of lower viscosity and less water resistant.

EXAMPLE 35

To 65 g (0.8 moles) of 37% formalin was added 24.5 g urea (0.4 moles) and 48 g n-propanol (0.8 moles) and heated with stirring to 60 degrees C., and held for 20 minutes. Heat was stopped and acrylic acid 60 g (0.8 moles) slowly added over 3 minutes with continuous stirring. At about 40 degrees, phosphoric acid 1 g was added and then cooled to room temperature. The resulting clear liquid resin was found to UV cure to a soft film which continued harden on further irradiation.

Similarly, resins were prepared by replacing propanol with 36 g of ethanol which gave a clear resin product with similar properties.

EXAMPLE 36

To 33 g (0.4 moles) 37% formalin was added 16 g (0.13 moles) melamine and 2.0 g diethanolamine heated with stirring to 60 degrees C. and held for 10 minutes, 16 g (0.25 moles) n-propanol was added and held at 60 degrees for a further 20 minutes. The resin was cooled to 30 degrees and acrylic acid 18 g (0.25 moles) and phosphoric acid 2 g added and stirred until cold. The resultant clear resin cures to a dry glossy film under UV radiation.

A similar batch was prepared except acrylic acid was increased by 50% to 27 g (0.38 moles) and no phosphoric acid. This resin was very similar and UV cured as before.

A third resin was prepared by replacing propanol with 14 g (0.25 moles) of ethanol and then adding 18 g acrylic acid and 2 g phosphoric acid. This resin behaved as in the other cases.

EXAMPLE 37

Using the same general procedure urea (1 mole, 60 g) was reacted with Glyoxal (1 mole, 145 g of a 40% solution) and then acrylic acid (2 moles, 144 g) added to form a salt. The resultant solution was capable of UV cure but the so formed film was water sensitive.

EXAMPLE 38

One mole of propylene oxide (58 g) was carefully added to one mole (105 g) of diethanolamine, and allowed to cool. Water (20 g) was added and then one mole (72 g) of acrylic acid. The adduct was tested as before and found to be water soluble, low odour and colour, low viscosity but only partially cures under UV radiation.

EXAMPLE 39

This example demonstrates preparation of compositions of the invention from michael adducts. One mole of tri propylene glycol diacrylate (300 g) was mixed with one mole (105 g) of diethanolamine and heated to 105° C. and held for 30 minutes. The product was then cooled to 90° C. and 90 g water added with stirring. 1 mole (72 g) of acrylic acid was slowly added. On testing for cure, this resin was found to cure only with 1–2% of photoinitiator (Irgacure 184).

EXAMPLE 40

To the resin of Example 3 was added 20% of aqueous pigment dispersions based on carbon black, diarylide yellow and phthalocyanine blue were added with stirring. These pigmented compositions were stable and when cast out as films and exposed to UV radiation, cured in a similar manner to the unpigmented resins previously described. The presence of pigment adversely affects the rate of cure, and small additions of photoinitiator may be used to accelerate the cure.

Example 41 and Comparative Example A

The composition of Example 20 was formed into a coating composition for use as a high gloss overprint varnish having the following compositions

EXAMPLE 41

| Component | Parts by Weight |
|---|---|
| Epoxy acrylate (Ex 20) | 80.0 |
| PA57 silicone glycol copolymer levelling agent | 0.5 |
| "Quatramine C16/50" (50% active solution of trimethyl hexadecyl ammonium chloride in a mixture of water and ethanol (levelling agent)) | 4.5 |
| Water | 15.0 |
| | 100.0 |

Viscosity Brookfield RVT #4/100/25° C. = 460 cps.

The composition was drawn down to a 5 micron coating on printed paper stock and cured using a mercury UV lamp of 80 w/cm at half power (ie 40 w/cm) half speed of 35 meters per min to provide a UV lamp energy of 25 millijoules per cm². The radiometer used to measure energy was a EIT Uvicure Radiometer model M365. The composition of the invention cured without addition of photoinitiator.

A conventional UV curable high gloss overprint varnish was prepared with the following composition.

Comparative Example A

| Component | Parts by Weight |
|---|---|
| Craynor CN104 A80 = Epoxy Acrylate cut with 20% T.P.G.D.A. | 43.0 |
| T.M.P.E.O.T.A. = Ethoxylated Trimethylolpropane Triacrylate | 48.5 |
| Methyldiethanolamine = Amine synergist | 3.0 |
| Benzophenone, Photoinitiator | 3.0 |
| Irgacure 184 = 1-Hydroxy-cyclohexyl-phenyl-ketone, Photoinitiator | 2.0 |
| PA57 = Silicone glycol Copolymer (levelling and slip agent) | 0.5 |
| | 100.0 |

Viscosity = Brookfield RVT #4/100/25° C. = 460 cps

The prior art composition required 5% photoinitiator and 3% amine synergist to cure under the same conditions.

Those skilled in the art will appreciate that there may be many variations and modifications of the configuration described herein which are within the scope of the present invention.

What is claimed is:

1. An ultraviolet light curable resin composition comprising an aqueous solution of an amine salt prepolymer formed by reaction in an aqueous mixture between an unsaturated carboxylic acid and an oligomer having at least one amine group selected from the group consisting of urea formaldehyde resins, melamine formaldehyde resins, amine-polyisocyanate adducts, Michael adducts of a secondary amine and acrylate and/or methacrylate compounds and epoxy-amine adducts formed between a secondary amine and epoxy of formula:

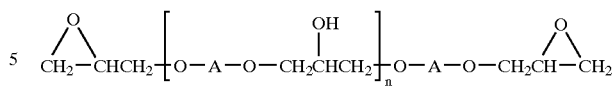

wherein n is from 0 to 10 and A comprises a diradical selected from the group consisting of aromatic, substituted aromatic and the diradical of formula II:

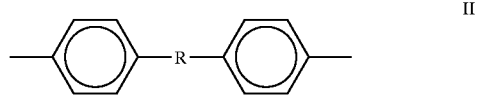

wherein R is an alkylene group of 1 to 4 carbon atoms.

2. A resin composition according to claim 1 comprising an aqueous solution containing a weight ratio of amine salt prepolymer to water in the range of from 1:4 to 20:1.

3. A resin composition according to claim 2 wherein said weight ratio is in the range of from 3:2 to 9:1.

4. A resin composition according to claim 1 which is curable by UV and contains less than 0.5% by weight based on the weight of the resin component of a UV initiator.

5. A resin composition according to claim 1 which is curable by UV in the absence of photoinitiator.

6. A resin composition according to claim 1 wherein the oligomer having at least one amine group is an epoxy-amine formed between a secondary amine and an epoxide of formula 1:

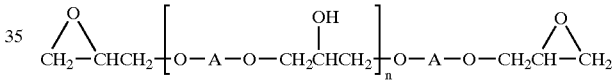

wherein n is from 0 to 10 and A is a diradical of formula II:

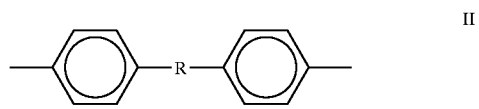

wherein R is an alkylene group of 1 to 4 carbon atoms.

7. A resin composition according to claim 6 wherein the epoxide of formula 1 is a product of epichlorohydrin and bisphenol A.

8. A resin composition according to claim 6, wherein the amine adduct is formed using a molar ratio of amine to epoxide compound in the range of from 0.5:1 to 2.05:1.

9. A resin composition according to claim 6 wherein the molar ratio of amine to epoxide compound is 0.95:1 to 1.6:1.

10. A resin composition according to claim 1 wherein the oligomer having at least one amine group is prepared from melamine, formaldehyde and/or glyoxal and optionally one or more alcohols selected from the group consisting of $C_1$ to $C_6$ alkanols, $C_1$ to $C_6$ alkyl ethers of $C_1$ to $C_6$ alkylene glycols and $C_1$ to C6 alkylene glycols.

11. A resin composition according to claim 1 wherein the oligomer having at least one amine group is a urethane-amine adduct prepared by reaction of a secondary amine with a polyisocyanate.

12. A resin composition according to claim 1 wherein the urethane amine adduct is formed from a molar ratio of amine to polyisocyanate of from 0.90:1 to 1.6:1.

13. A resin composition according to claim 1 wherein the oligomer having at least one amine group is a Michael adduct formed between a secondary amine and an unsaturated compound selected from the group consisting of monomers and prepolymers comprising a plurality of unsaturated groups including at least one acrylate or methacrylate group.

14. A resin composition according to any one of claims 6 to 9 wherein the secondary amine is amine of formula IV:

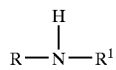

wherein R and $R^1$ are independently selected from straight and branched chain aliphatic of up to 6 carbon atoms optionally substituted by hydroxy and mixtures thereof.

15. A resin composition according to claim 1 wherein the unsaturated acid is selected from the group consisting of acrylic acid, methacrylic acid, crotonic acid, citraconic acid, sorbic acid, fumaric acid and mixtures of two or more thereof.

16. A resin according to claim 1 wherein the unsaturated acid is selected from the group consisting of acrylic acid and methacrylic acid.

17. A method of forming a coating on a substrate comprising applying to the substrate a layer of an aqueous solution of a radiation curable resin according to claim 1 and subjecting the layer of said aqueous solution to ultraviolet radiation to cure the layer.

18. The method according to claim 17 wherein the composition is applied at a thickness of up to 200 microns.

19. A method according to claim 17 wherein the concentration of the radiation curable resin according to claim 1 is from 20 to 95% by weight of the total aqueous solution.

* * * * *